(12) United States Patent
Lim et al.

(10) Patent No.: US 7,783,125 B2
(45) Date of Patent: Aug. 24, 2010

(54) MULTI-RESOLUTION PROCESSING OF DIGITAL SIGNALS

(75) Inventors: Suk Hwan Lim, San Mateo, CA (US); Ron Maurer, Haifa (IL); Pavel Kisilev, Maalot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 695 days.

(21) Appl. No.: 11/174,686

(22) Filed: Jul. 5, 2005

(65) Prior Publication Data
US 2007/0009176 A1    Jan. 11, 2007

(51) Int. Cl.
G06K 9/40    (2006.01)
(52) U.S. Cl. .................................. 382/265; 382/275
(58) Field of Classification Search ................. 382/265, 382/275, 240, 261
See application file for complete search history.

(56) References Cited

U.S. PATENT DOCUMENTS

| | | | | |
|---|---|---|---|---|
| 5,561,617 | A * | 10/1996 | van der Wal | 708/308 |
| 6,208,348 | B1 * | 3/2001 | Kaye | 345/419 |
| 7,057,773 | B2 * | 6/2006 | Ilbery | 358/3.05 |
| 7,068,851 | B1 * | 6/2006 | Berkner | 382/261 |
| 7,079,703 | B2 * | 7/2006 | Kriss | 382/275 |

OTHER PUBLICATIONS

Aiazzi et al., "Pyramid-based multiresolution adaptive filters for additive and multiplicative image noise," IEEE Transactions on Circuits and systems, vol. 45, No. 8, pp. 1092-1097 (Aug. 1998).
Gezici et al., "Image denoising using adaptive subband decomposition," IEEE 0-7803-6725-1/01, pp. 261-264 (2001).
Aiazzi et al., Multiresolution adaptive filtering of signal-dependent noise based on a generalized Laplacian pyramid, IEEE 0-8186-8163-7/97, pp. 381-384 (Jul. 1997).
Aiazzi et al., Multiresolution de-speckle based on Laplacian pyramids, IEEE 0-7803-3068-4/96, pp. 411-413 (Apr. 1996).
Surendra Ranganath, "Image filtering using multiresolution representations," IEEE Transactions on pattern analysis and machine intell., vol. 13, No. 5, pp. 426-440 (May 1991).

* cited by examiner

*Primary Examiner*—Bhavesh M Mehta
*Assistant Examiner*—Stephen R Koziol

(57) ABSTRACT

Representations of an input signal at different lower resolutions are obtained, where n denotes a level of resolution, and where $0 \leq n \leq N$. Level n=N corresponds to the representation having the lowest resolution, and level n=0 corresponds to the input signal. The resolution increases as level n decreases. The $n^{th}$ level representation is used to estimate and remove low frequency error in the $n-1^{th}$ level representation. Then application-specific processing is performed on the $n-1^{th}$ level representation.

36 Claims, 4 Drawing Sheets

FIG. 6a
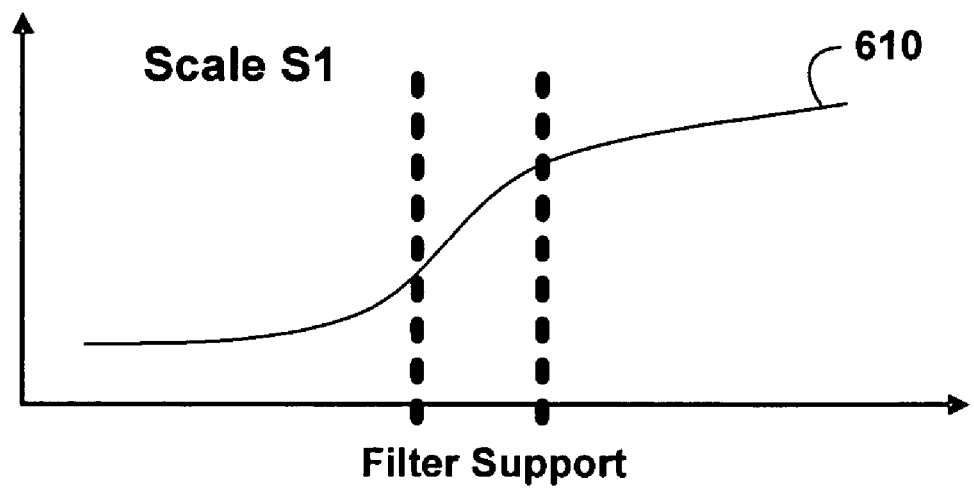
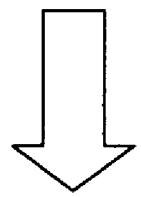
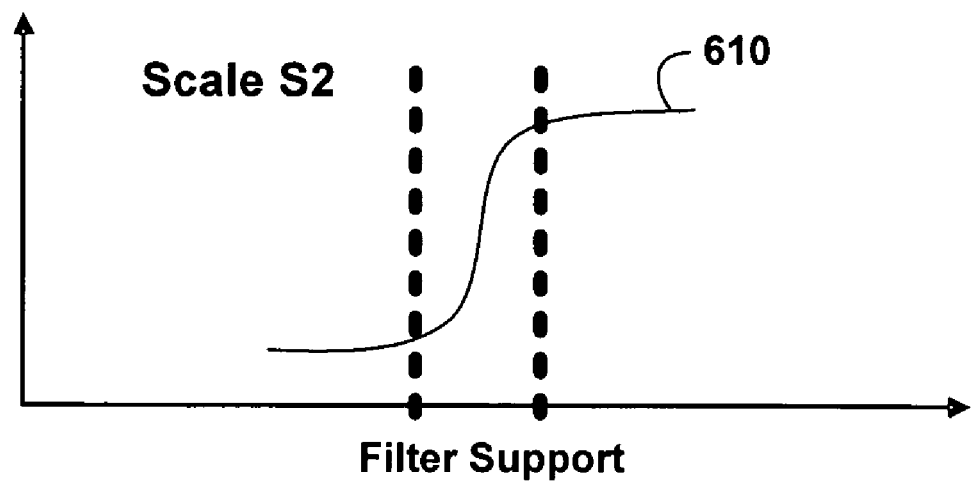
FIG. 6b

MULTI-RESOLUTION PROCESSING OF DIGITAL SIGNALS

BACKGROUND

Signal capture devices such as digital, still and video cameras produce raw digital signals (images, video, sound) that contain noise. The noise can result from a device's image sensor, read channel, etc. The noise in images, for example, can be exacerbated by post-processing such as demosaicing, tone mapping, and color correction.

Post-processing algorithms such as denoising, sharpening and equalization should be able to distinguish between noise and signal features. For example, if sharpening cannot distinguish noise from image features, it will amplify noise and artifacts. If denoising cannot distinguish between noise and image features, it will oversmooth features such as edges and texture.

SUMMARY

According to one aspect of the present invention, representations of an input signal at different lower resolutions are obtained, where n denotes a level of resolution, and where $0 \leq n \leq N$. Level n=N corresponds to the representation having the lowest resolution, and level n=0 corresponds to the input signal. The resolution increases as level n decreases. The $n^{th}$ level representation is used to estimate and remove low frequency error from the n−1$^{th}$ level representation. Then application-specific processing is performed on the n−1$^{th}$ level representation.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIGS. 6a and 6b are illustrations of an edge at different spatial resolutions.

DETAILED DESCRIPTION

Figure 1:
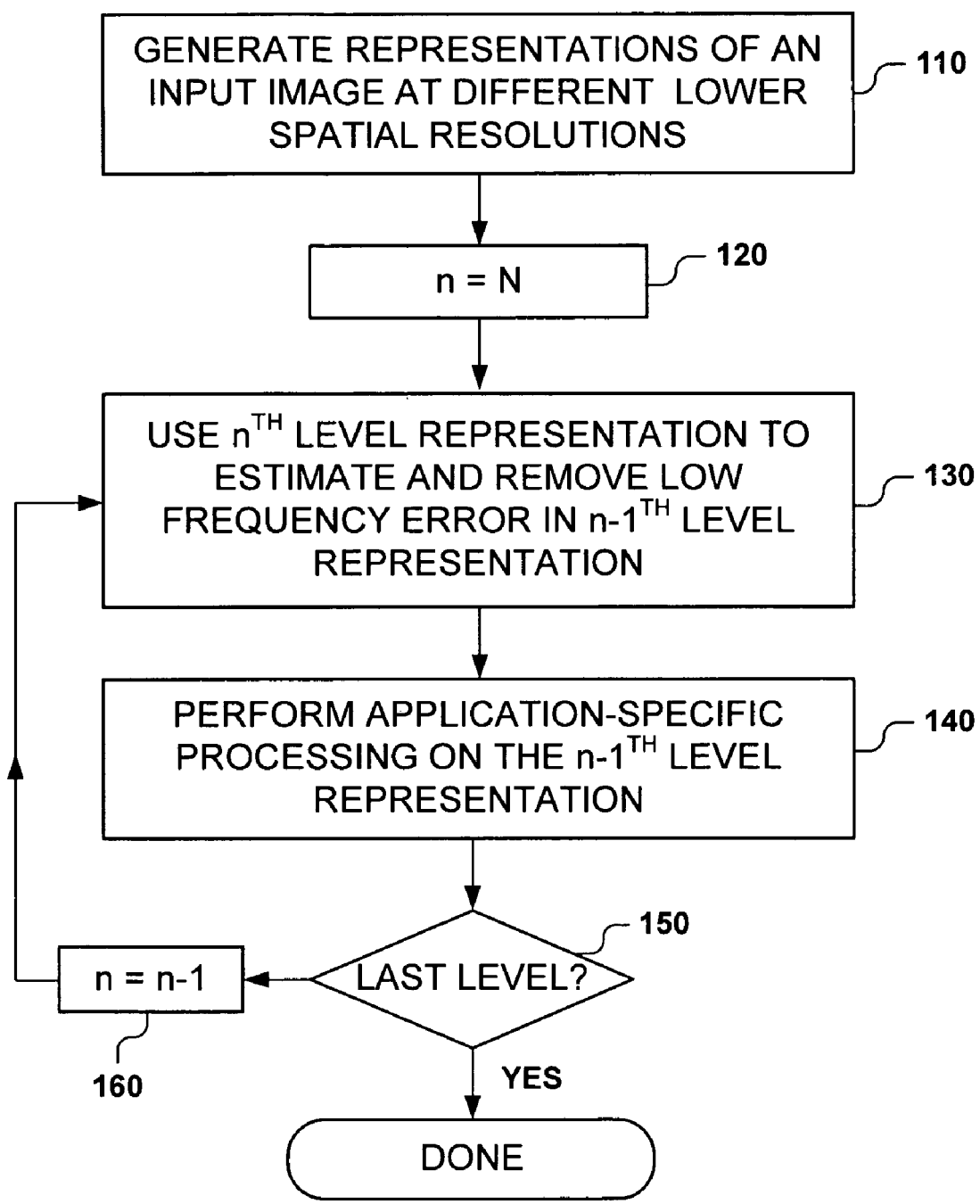
FIG. 1 is an illustration of a digital signal processing method in accordance with an embodiment of the present invention.

Reference is made to FIG. 1, which illustrates a method of processing an input digital signal. By way of example, the signal is a digital image.

At step 110, representations of the input image are generated at different lower spatial resolutions, where n denotes a level of spatial resolution, where $0 \leq n \leq N$. Level n=N corresponds to the representation having the lowest spatial resolution, and level n=0 corresponds to the input image, which has the highest spatial resolution. The spatial resolution increases as level n decreases.

The number of levels N may be determined by finding a uniform patch in the input image, estimating the spatial correlation of noise and artifacts in the patch, and determining the value of N from coordinates of the spatial correlation. The spatial correlation of the uniform patch may be computed as $COR(a,b)=\text{sum}\{\text{sum}\{f(x,y)*f(x-a,x-b)\}\}$ where x and y are pixel locations, where the function sum( ) is a summation in x and y, and where a and b represent the coordinates of the spatial correlation. A region (a,b) may be found where the absolute value of CORR(a,b) is greater than a threshold (i.e. where CORR(a,b) of the uniform patch has a significant value). Let W be half the width of this region (a,b). For example, if $|CORR(a,b)|>$Threshold for $(-3<a<3$ and $-3<b<3)$, then W=3. The value of N should at least satisfy $2^N>W$. If the device that captured the input image is known, the number of levels may be estimated from characteristics of the device.

On the other hand, the spatial correlation of noise and artifacts might already be roughly known. For instance, the spatial correlation would be known if the input image was captured by a digital camera, since most digital cameras use Bayer patterns for image capture and JPEG for image compression. As a first example, W may be W=2 if no compression is performed. As a second example, W may be W=4 if JPEG compression is performed on 8×8 blocks.

Figure 2:
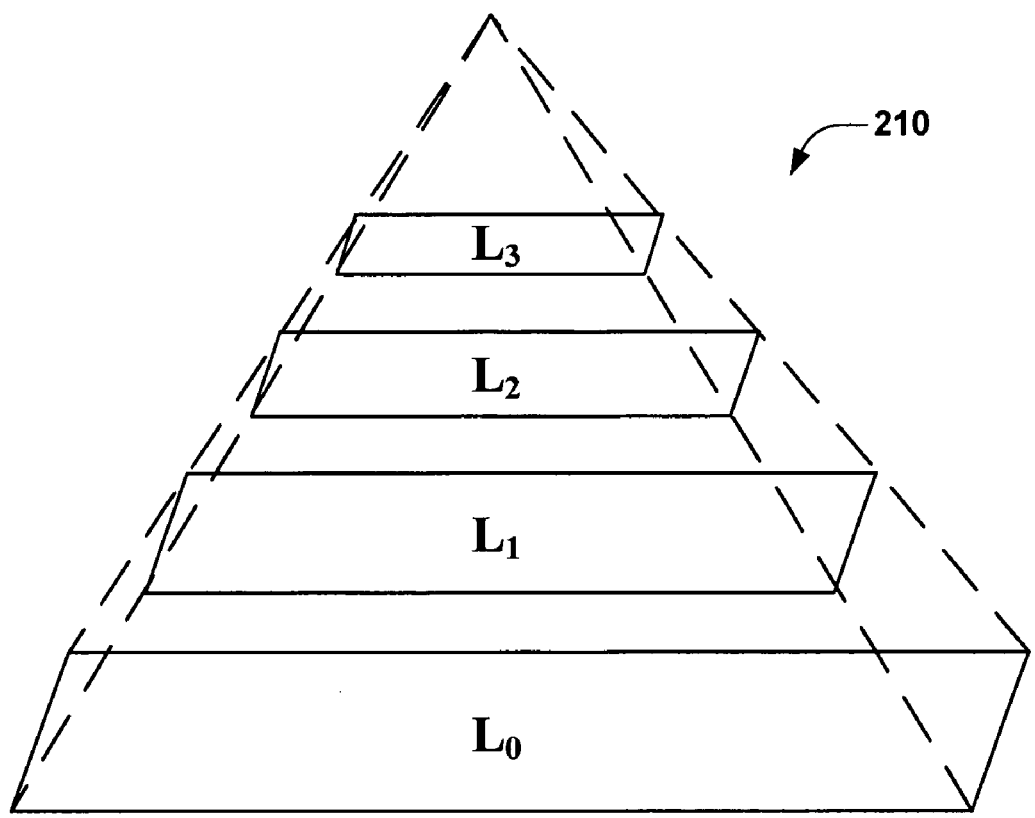
FIG. 2 is an illustration of a multi-resolution pyramid.

Additional reference is made to FIG. 2. For example, a multi-resolution pyramid 210 may be created at step 110. The pyramid 210 shown in FIG. 2 has N=3 levels. The lowest spatial resolution is the third level (L3) of the pyramid. The second level (L2) of the pyramid has a higher spatial resolution than the third level (L3), and the first level (L1) of the pyramid 210 has a higher spatial resolution than the second level (L2). The base of the pyramid (L0) corresponds to the input digital image.

The pyramid 210 of FIG. 2 may be a Gaussian pyramid. In a Gaussian pyramid, the $n^{th}$ level representation may be created from the n−1$^{th}$ level representation by smoothing the n−1$^{th}$ level representation and then downsampling the smoothed n−1$^{th}$ level representation. Thus, the first level representation (L1) is created by smoothing and downsampling the input image, and so on, until the third level representation is created. If the downsampling is performed by a factor of 2, the size (or the spatial resolution) of the $n^{th}$ level representation is $2^n \times 2^n$ smaller than the size of the input image.

The pyramid, in a sense, represents the input image in both the spatial and frequency domains. High frequency error in the $n^{th}$ level corresponds to low frequency error in the n−1$^{th}$ level. If the downsampling is performed at a factor of 2, a frequency of f at the n−1$^{th}$ level representation roughly corresponds to 0.5 f at the $n^{th}$ level representation.

If the input image is a color image, step 110 is performed for each color channel of the input image. Sometimes cross-channel correlations can be exploited by processing color channels jointly at a given level. Thus, three sets of representations are produced, one for each color channel. The luminance channel typically requires fewer representations than the chrominance channels. The following steps are then performed on each set.

Reference is once again made to FIG. 1. Processing starts at the $N^{th}$ level (lowest spatial resolution) representation. Thus, processing starts at level n=N, where n represents the level being processed (step 120).

At step 130, the $N^{th}$ level representation is used to estimate $N^{th}$ level error and remove the $N^{th}$ level error from the N−1$^{th}$ level representation. At step 140, application-specific processing is performed on the N−1$^{th}$ level representation. The application-specific processing may include, without limitation, any one of denoising, sharpening, contrast enhancement, JPEG artifact removal, and inverse halftoning.

Error in the $N^{th}$ level representation may be estimated by performing application-specific processing on the $N^{th}$ level representation and determining the difference between the $N^{th}$ level representation before and after the application-specific processing. Let $L_N$ represent the $N^{th}$ level representation before the application-specific processing, and let $f_N()$ represent an application-specific processing function for the $N^{th}$ level. The $N^{th}$ level error ($eL_N$) may be computed as $eL_N = f(L_N) - L_N$.

The $N^{th}$ level error is propagated to the next lower level. The $N^{th}$ level error may be removed from the $N-1^{th}$ level representation by performing a nearest neighbor replication of the $N^{th}$ level error (so that the $N^{th}$ level error and the $N-1^{th}$ level representation have the same image size), and then adding the replicated error to the $N-1^{th}$ level representation. Bilinear interpolation or another type of interpolation (e.g., bi-cubic interpolation) may be used instead of the nearest neighbor replication.

Antialiasing can be performed on the $N^{th}$ level error. The antialiasing may be performed selectively: since aliasing occurs only at sharp prominent edges, the antialiasing can be performed only on those pixels at sharp prominent edges.

Steps 130-140 may be performed on the lower level (higher spatial resolution) representations (steps 150-160). At step 160, n is decremented to the next lower level (i.e., n=n-1). The $n^{th}$ level representation is used to estimate and remove the low-frequency error in the $n-1^{th}$ level representation. Then application-specific filtering is performed on the $n-1^{th}$ level representation. At each level, error is computed from the previous level and removed. Thus, signal errors are recursively corrected and propagated to lower levels.

Steps 130-140 may be performed on each additional representation until the $1^{st}$ level error is removed from the input image (level 0). The input image is then processed one last time with application specific processing and provided as an output image.

Steps 130-140 may instead be performed up to the $P^{th}$ level representation, where P>0. For example, the processing may stop at the $P^{th}$ level if the human visual system would not be sensitive to the application-specific processing in levels 0 to P-1. If the processing is stopped at the $P^{th}$ level, the $P^{th}$ level representation can be upsampled (or otherwise expanded). In the alternative, only step 130 can be repeated (without the processing in step 140) on the representations between levels P and 0.

The representations at the different resolutions are recombined. The recombination in the method of FIG. 1 is performed in a serial, propagative fashion (unlike conventional multi-resolution techniques, which process the representations at different resolutions in parallel and independent of each other). Therefore, the processing of each resolution level depends on and can utilize processed results from the previous level. The advantage of the propagative (serial) recombination over traditional (parallel) recombination is the ability to use low-resolution context to guide higher resolution filtering. For example, if the processing should be sensitive to the local average signal as in some noise models, than at each resolution level, the input image contains the necessary information from the low-resolution version.

As another example, when using the method of FIG. 1 for selective sharpening and, the higher resolution representations are being processed, high-frequency structures imposed on a flat background that may correspond to texture (preferably to be sharpened) can be separated from high-frequency structures riding on a large-scale edge (probably noise, or mild texture that is not visible in the presence of a strong edge—preferably not to be sharpened). It is harder to distinguish the two structures in traditional multi-resolution methods.

An advantage of using a Gaussian pyramid is that the top level of the pyramid has much higher signal-to-noise-ratio (due to the averaging that is performed to generate the Gaussian pyramid). Thus, noise is easier to distinguish.

A method according to the present invention is not limited to the example illustrated in FIG. 2. For example, a Gaussian pyramid is not limited to downsampling by a factor of two. The factor can be higher than two and combinations of different downsampling factors can be used.

A method according to the present invention is not limited to a Gaussian pyramid. For example, a Laplacian pyramid may be used to generate the representations at different spatial resolutions. The method is not even limited to a hierarchical structure such as a pyramid.

Reference is now made to Table 1, which provides an exemplary algorithm for processing an input digital signal. The function $nlfilter_n()$ is an edge-aware parameterized non-linear filter function. The $n^{th}$ level representation before filtering is denoted as $l_n$ and the $n^{th}$ level representation after filtering is denoted as $dl_n$. The $n-1^{th}$ level error is denoted by $(dl_{n-1} - l_{n-1})$. The function $f_n()$ estimates low frequency error at the $n+1^{th}$ level.

TABLE 1

1) generate a multi-resolution pyramid having levels $l_0, l_1, ..., l_N$
2) compute $dl_N = nlfilter_N(l_N)$; and
3) for each level n=N-1, ..., L, (0≤L≤N-1)
   compute $dl_n = nlfilter_n(l_n + f_n(dl_{n+1}, l_{n+1}))$ Due to its multi-resolution structure, the algorithm of Table 1 may be implemented using small kernel filters (typically 5×5) to eliminate noise at each level, while adjusting the feature-preserving characteristics at each level. As an advantage, the small kernel filters use a lower context window and fewer taps than conventional algorithms that operate on images at full spatial resolution. Thus, the need for a huge neighborhood support is eliminated.

Reducing the window size has additional advantages, since larger windows can have an undesirable effect of over-smoothing the image. Larger windows also have much higher computational complexity.

Another advantage of the algorithm of Table 1 in particular, and the method in general, is that any type of application-specific filtering can be performed. Yet another advantage is that any conventional algorithm can be used for the application-specific filtering.

Examples of application-specific filtering will now be provided for three different filter classes. The first class encompasses filters that distinguish noise and artifacts from image features. The second class encompasses filters that perform low pass filtering. The third class encompasses filters that provide high frequency boost.

The first class of filters includes filters for denoising, inverse halftoning, JPEG/MPEG artifact reduction, and film grain reduction. The same type of filtering may be performed at all levels, but different filtering algorithms may be used at different levels. A filtering algorithm may be selected for a given level according to factors such as algorithm complexity, required accuracy at the given level, human sensitivity to noise at the given level (when the rendering circumstances such as print size are known), etc. The selection of an algorithm may also depend on user preference (e.g., how much noise a user can tolerate). Preferably, the denoising filter or filters preserve image features such as edges. Examples of feature-preserving denoising filters include, without limitation, bilateral filters, adaptive filters, Wavelet filters, Bayesian filters, and ICA/PCA filters. A filter that preserves image features, and is also adaptive to local noise level, is disclosed in U.S. Ser. No. 11/174,685 filed on Jul. 5, 2005, which is incorporated herein by reference.

Denoising in accordance with the present invention can remove low frequency, spatially correlated noise from digital images. However, the denoising is also effective for additive white Gaussian noise (AWG), even if the noise is very high.

Inverse halftoning in accordance with the present invention can reduce halftone patterns in images that were captured from halftone prints. Inverse halftoning according to the present invention could be performed as illustrated in FIG. 1, except that the processing stops at P>0. If prior knowledge of the halftone pattern or its size is available, this knowledge may be used to tune the parameters of the inverse halftoning filter and determine the number of pyramid levels.

JPEG/MPEG artifact reduction in accordance with the present invention can reduce the visibility of JPEG and MPEG artifacts in digital images. The artifacts include block artifacts, and smoothing and deringing artifacts. These artifacts, which are created sometime during compression-decompression, can be treated as low frequency noise. If the quantization table used for compression is known in advance, this knowledge can be used to modify the filtering.

Film grain reduction according to the present invention can reduce the visibility of film grains in films that were digitized. The film grains can be treated as low frequency, spatially correlated noise. If the film grain reduction is performed on movies, temporal information can be used as well. If the grain size and scan resolution are known in advance of filtering, this information can also be used to decide the number of pyramid levels.

The second class includes low pass filters that perform large-scale smoothing. Low pass filters according to the present invention are less complex than conventional low pass filters, since smaller taps and a smaller neighborhood may be used. The low pass filters are not limited to any particular algorithm. For example, a Gaussian kernel could be modified with different kernel sizes and different sigmas.

The third class includes sharpening, contrast enhancement and other filters that provide high frequency boost. Sharpening according to the present invention involves generating an $n^{th}$ level error that represents the difference between sharpened and unsharpened $n^{th}$ level representations. The $n^{th}$ level error is then upscaled and added to the $n-1^{th}$ level representation to enhance the visibility of dominant features.

Sharpening in accordance with the present invention has a selective nature in spatial or temporal domain (or both domains), and in scale (resolution). The sharpening adapts to intrinsic sharpness of features (e.g. edges).

Consider a scene captured by a digital camera. Intrinsic resolution of the image is determined by the camera. Furthermore, for a camera with a particular depth-of-focus setting, the captured scene contains objects with various degrees of blur. Thus, edges in the captured scene have various degrees of sharpness (i.e., various degrees of slope).

Also consider texture in an image. The texture usually appears only at one or several resolution levels. Thus, the image can contain several dominant frequencies.

Sharpening according to the present invention allows the same filter with a fixed support to be used at all levels. A single, fixed support filter is optimal for different features at different scales, since the same edge has different slopes at different scales (compare the edge 610 at scale S1 in FIG. 6a to the edge 610 at scale S2 in FIG. 6b). Only those edges that correspond to the fixed filter support are sharpened at a given resolution. Edges with a lower slope (that is, wider support) will not be detected at a particular scale since they are wider than the filter support, and the differences between the neighboring pixels comprising an edge are very small. Those edges will be sharpened at lower resolutions, since they will be squeezed and, therefore, will have a higher slope at those resolutions. Because the fixed filter support sharpens an edge only at is optimal scale, propagative over-sharpening is avoided.

The sharpening may be made selective. For example, the photometric function in a bilateral filtering can be changed such that differences larger than certain threshold are amplified.

Contrast enhancement according to the present invention can be performed by applying an unsharp masking filter to the higher levels. However, contrast enhancement according to the present invention is not limited to unsharp masking filters. Other filters having a high frequency boost may be used.

A method according to the present invention is not limited to a single type of filtering at each level. As a first example, a bilateral filter that performs denoising, artifact reduction, and sharpening may be used at each level.

As a second example, a filter that combines selective smoothing and sharpening can be used at each level. A bi-selective filter decides whether to smooth a particular pixel (that is make it similar to its neighbors) or to amplify its contrast (sharpen) to further distinguish it from its neighbors. This decision can be made by comparing the difference between the pixel and its neighbors to a threshold value. The threshold may depend on the measured noise level (either local or global). If the difference is lower than the threshold value, smoothing is performed. Otherwise, sharpening is performed.

A method according to the present invention is not limited to the same type of application-specific filtering at all levels. Different types of application-specific filtering may be performed at different levels. As a first example, sharpening is performed at the third level, denoising is performed at the second and first levels, and sharpening is performed on the input image. As a second example, application-specific filtering is performed at some levels, but not at others. As a third example, sharpening is performed at some levels, and smoothing is performed at other levels.

A method according to the present invention is not limited to the processing of digital images. The method could be applied to other input signals, such as video and audio. If the input signal is audio or video, representations of the input signal are generated at different temporal resolutions. Level n=N corresponds to the representation having the lowest temporal resolution, and level n=0 corresponds to the input signal. The $n^{th}$ level representation is used to estimate and remove the $n^{th}$ level error from the $n-1^{th}$ level representation. Then application-specific processing such as denoising, artifact reduction and equalization is performed on the $n-1^{th}$ level representation. Processing may be continued by recursively correcting signal errors and propagating the signal errors to lower levels.

A method according to the present invention is not limited to any particular platform. The method can be used by computers, imaging devices (e.g., digital cameras, scanners, and certain PDAs and mobile phones) and printers. The method can also be used in copiers, all-in-one devices and other devices that perform inverse halftoning.

Figure 3:
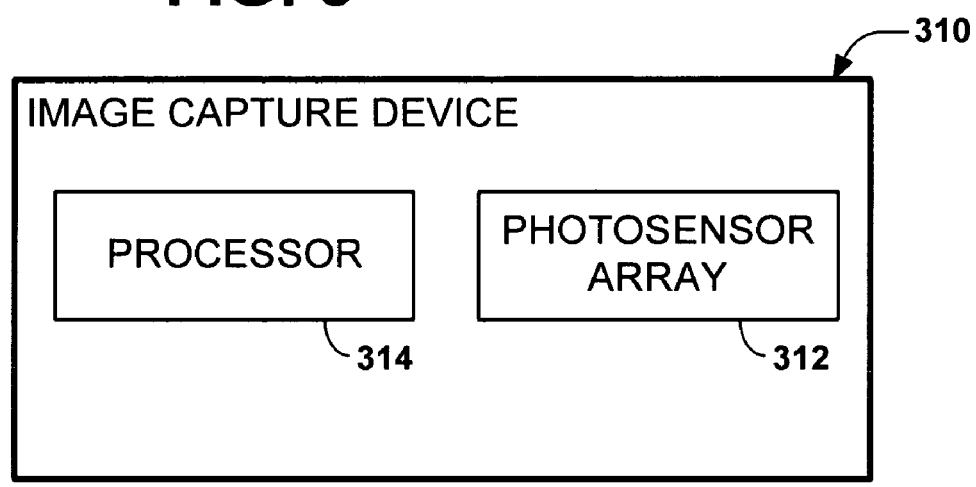
FIGS. 3-5 are illustrations of digital signal processing systems in accordance with embodiments of the present invention.

Reference is made to FIG. 3, which illustrates an image capture device 310 in accordance with the present invention. The image capture device 310 includes a photosensor array 312 that typically generates images having less than full color information at each pixel. The image capture device 310 further includes a processor 314 for demosaicing the captured images (i.e., processing the captured images into images that have full color information at each pixel). The processor 314 also performs filtering in accordance with the present invention. The processor 314 may be a digital signal processor, or it may include a state machine, or it may include an embedded processor and memory, or it may have some other design. The image capture device 310 may be, for example, a digital camera, scanner, cell phone or PDA.

Figure 4:
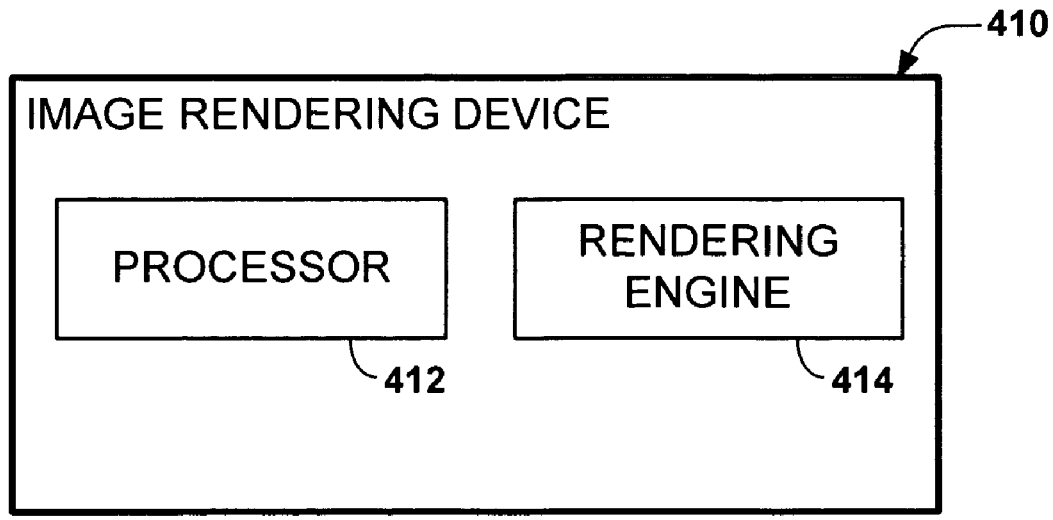

Reference is made to FIG. 4, which illustrates an image rendering device 410. The image rendering device 410 includes a processor 412 and a rendering engine 414 (e.g., a print engine). In an image rendering device 410 such as a printer, the processor 412 might decode a JPEG bit stream, filter the decoded bit stream, perform halftoning on the filtered bit stream, and send the bit stream to the rendering engine 414. The filtering may include denoising in accordance with the present invention. For an image rendering device 410 such as a copier, the processor 412 may perform inverse halftoning on a captured image in accordance with the present invention.

Figure 5:
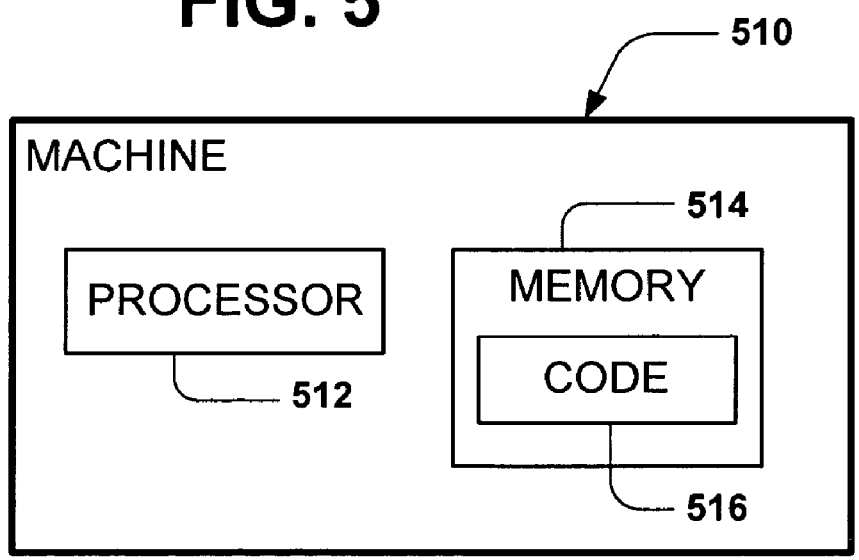
Figure 5:
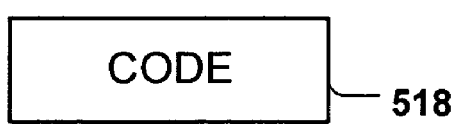

Reference is made to FIG. 5, which illustrates a system 510 that performs processing in accordance with the present invention. The system 510 includes a general purpose processor 512 and memory 514 encoded with executable code 516 for causing the processor 512 to process digital images in accordance with the present invention. The system 510 may be, for example, a personal computer. Input images may be supplied to the system 510 directly by an image capture device or indirectly (via the Internet, accessed from remote or local storage, etc.). The system 510 may supply processed images, directly or indirectly, to an image rendering device, another computer, etc.

A machine for generating the code 516 may be a personal computer such as the one shown in FIG. 5. Source code is generated and compiled into executable code 518.

The code 518 may be distributed in variety of ways. For example, the code 518 may be distributed to a digital camera by burning the code into memory (e.g., EPROM) of the digital camera. The code 518 might be distributed to another computer, removable storage medium (e.g., CD), etc. The code 518 might be distributed as a standalone program, a web browser plug-in, as part of a larger program, etc.

Although specific embodiments of the present invention have been described and illustrated, the present invention is not limited to the specific forms or arrangements of parts so described and illustrated. Instead, the present invention is construed according to the following claims.

The invention claimed is:

1. A computer-implemented method comprising:
   determining an image pyramid from an input image, the image pyramid comprising a sequence of successive images, wherein each of the successive images has a respective spatial resolution that is higher than that of the preceding image in the sequence;
   filtering a selected one of the successive images to produce a filtered image;
   ascertaining a comparison image from a comparison of the selected image and the filtered image;
   correcting a next one of the successive images following the selected image in the sequence based on the comparison image to produce a corrected image; and
   repeating the filtering with the corrected image as the selected image.

2. The method of claim 1, further comprising iterating the ascertaining, the correcting, and the repeating.

3. The method of claim 1, wherein ascertaining comprises determining the comparison image from a difference between the selected image and the filtered image.

4. The method of claim 3, wherein the correcting further comprises deriving an upsampled version the comparison image at the spatial resolution of the next image and correcting the next image based on the upsampled version of the comparison image.

5. The method of claim 3, wherein the correcting further deriving an anti-aliased version of the comparison image and correcting the next image based on the anti-aliased version of the comparison image.

6. The method of claim 1, further comprising:
   iterating the ascertaining, the correcting, and the repeating; and
   terminating the iterating before all of the successive images have been corrected.

7. The method of claim 1, further comprising iterating the ascertaining, the correcting, and the repeating until all the successive images have been filtered.

8. The method of claim 1, wherein the filtering comprises applying different types of filters to respective ones of the successive images.

9. The method of claim 1, wherein the filtering comprises applying a respective edge-aware filter to each of the selected images.

10. The method of claim 1, wherein the filtering comprises applying a respective noise-level adaptive and feature-preserving filter to each of the selected images.

11. The method of claim 1, wherein the determining comprises iteratively smoothing and downsampling each of the successive images in order from highest spatial resolution to lowest spatial resolution.

12. The method of claim 1, wherein the filtering comprises denoising each of the selected images.

13. The method of claim 1, wherein the filtering comprises inverse halftoning each of the selected images.

14. The method of claim 1, wherein the filtering comprises applying a respective compression artifact removal filter to each of the selected images.

15. The method of claim 1, wherein the filtering comprises applying a respective film grain reduction filter to each of the selected images.

16. The method of claim 1, wherein the application filtering comprises applying a respective selective smoothing filter to each of the selected images.

17. The method of claim 1, wherein the filtering comprises sharpening each of the selected images.

18. The method of claim 17, wherein filtering comprises applying an identical filter to each of the selected images.

19. The method of claim 1, wherein the filtering comprises selectively smoothing and sharpening each of the selected images.

20. A method of filtering a digital input signal, the method comprising:
   generating a multi-resolution pyramid having levels $I_0, I_1, \ldots, I_N$, where the level $I_N$ corresponds to the lowest resolution;
   computing $dI_N = \text{nlfilter}_N(I_N)$; and
   for each level $n = N-1, \ldots, 0$,
      computing $dI_n = \text{nlfilter}_n(I_n + f_n(dI_{n+1}, I_{n+1}))$
   where $\text{nlfilter}_n(\ )$ is an edge-aware parameterized non-linear filter and where function $f_n(\ )$ estimates low frequency error at the $n+1^{th}$ level.

21. The method of claim 20, wherein the function $f(\ )$ computes the difference $(dI_{n+1} - I_{n+1})$ and interpolates the difference to the next higher resolution.

22. Apparatus for filtering an input digital signal, the apparatus comprising:

means for determining an image pyramid from an input image, the image pyramid comprising a sequence of successive images, wherein each of the successive images has a respective spatial resolution that is higher than that of the preceding image in the sequence;

means for filtering a selected one of the successive images to produce a filtered image;

means for ascertaining a comparison image signal from a comparison of the selected image and the filtered image;

means for correcting a next one of the successive images following the selected image in the sequence based on the comparison image signal to produce a corrected image; and means for repeating the filtering with the corrected image as the selected image.

23. Apparatus, comprising:

a computer-readable medium storing computer-readable instructions; and a data processing unit coupled to the computer-readable medium, operable to execute the instructions, and based at least in part on the execution of the instructions operable to perform operations comprising determining an image pyramid from an input image, the image pyramid comprising a sequence of successive images, wherein each of the successive images has a respective spatial resolution that is higher than that of the preceding image in the sequence, filtering a selected one of the successive images to produce a filtered image;

ascertaining a comparison image signal from a comparison of the selected image and the filtered image, correcting a next one of the successive images following the selected image in the sequence based on the comparison image signal to produce a corrected image, and repeating the filtering with the corrected image as the selected image.

24. The apparatus of claim 23, wherein based at least in part on the execution of the instructions the data processing unit is operable to perform operations comprising iterating the ascertaining, the correcting, and the repeating.

25. The apparatus of claim 23, wherein in the ascertaining the data processing unit is operable to perform operations comprising determining the comparison image from a difference between the selected image and the filtered image.

26. The apparatus of claim 23, wherein based at least in part on the execution of the instructions the data processing unit is operable to perform operations comprising:

iterating the ascertaining, the correcting, and the repeating; and terminating the iterating before all of the successive images have been corrected.

27. The apparatus of claim 23, wherein based at least in part on the execution of the instructions the data processing unit is operable to perform operations comprising iterating the ascertaining, the correcting, and the repeating until all the successive images have been filtered.

28. The apparatus of claim 23, wherein in the filtering the data processing unit is operable to perform operations comprising applying different types of filters to respective ones of the successive images.

29. The apparatus of claim 23, wherein in the filtering the data processing unit is operable to perform operations comprising applying a respective edge-aware filter to each of the selected images.

30. The apparatus of claim 23, wherein in the filtering the data processing unit is operable to perform operations comprising denoising each of the selected images.

31. The apparatus of claim 23 wherein in the filtering the data processing unit is operable to perform operations comprising sharpening each of the selected images.

32. At least one computer readable memory device having computer program code embodied therein, the computer-readable program code that, when executed by a computer, causes the computer to perform operations comprising:

determining an image pyramid from an input image, the image pyramid comprising a sequence of successive images, wherein each of the successive images has a respective spatial resolution that is higher than that of the preceding image in the sequence;

filtering a selected one of the successive images to produce a filtered image;

ascertaining a comparison image signal from a comparison of the selected image and the filtered image;

correcting a next one of the successive images following the selected image in the sequence based on the comparison image signal to produce a corrected image; and repeating the filtering with the corrected image as the selected image.

33. The at least one computer readable memory device of claim 32, wherein, when executed by the computer, the computer-readable program code causes the computer to perform operations comprising iterating the ascertaining, the correcting, and the repeating.

34. The at least one computer readable memory device of claim 32, wherein the filtering comprises filtering each of the selected images with at least one filter selected from a denoising filter, a sharpening filter, a contras enhancement filter, a JPEG artifact removal filter, an inverse halftoning filter, and a film grain reduction filter.

35. The method of claim 1, wherein the comparison image estimates low-frequency error in the selected image.

36. The method of claim 1, wherein the correcting comprises filtering a combination of the next one of the successive images and the comparison image, and producing the corrected image from the filtered combination.

* * * * *

UNITED STATES PATENT AND TRADEMARK OFFICE
CERTIFICATE OF CORRECTION

PATENT NO. : 7,783,125 B2  
APPLICATION NO. : 11/174686  
DATED : August 24, 2010  
INVENTOR(S) : Suk Hwan Lim et al.

Page 1 of 1

It is certified that error appears in the above-identified patent and that said Letters Patent is hereby corrected as shown below:

In column 8, line 2, in Claim 4, after "version" insert -- of --.

In column 10, line 15, in Claim 31, after "claim 23" insert -- , --.

Signed and Sealed this
Twenty-seventh Day of March, 2012

David J. Kappos
*Director of the United States Patent and Trademark Office*